(12) United States Patent
Chapman et al.

(10) Patent No.: US 10,994,518 B2
(45) Date of Patent: May 4, 2021

(54) THERMALLY LAYERED FIRE TREATED VENEER PANEL

(71) Applicant: Goodrich Corporation, Charlotte, NC (US)

(72) Inventors: Christopher L. Chapman, Georgetown, IN (US); Nicholas William Linck, LaGrange, KY (US); Brian Barnett, New Albany, IN (US); John Michael Striegel, Sellersburg, IN (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/458,698

(22) Filed: Jul. 1, 2019

(65) Prior Publication Data

US 2021/0001606 A1  Jan. 7, 2021

(51) Int. Cl.
| | | |
|---|---|---|
| B32B 21/14 | (2006.01) | |
| B32B 7/12 | (2006.01) | |
| B32B 15/20 | (2006.01) | |
| B32B 21/04 | (2006.01) | |
| B32B 15/10 | (2006.01) | |
| B32B 37/12 | (2006.01) | |

(52) U.S. Cl.
CPC ............... *B32B 21/14* (2013.01); *B32B 7/12* (2013.01); *B32B 15/10* (2013.01); *B32B 15/20* (2013.01); *B32B 21/042* (2013.01); *B32B 37/12* (2013.01); *B32B 2605/18* (2013.01)

(58) Field of Classification Search
CPC ......... B32B 21/14; B32B 15/10; B32B 15/20; B32B 2605/18; B32B 7/12; B32B 21/042; B32B 37/12; B64C 1/40
See application file for complete search history.

(56) References Cited

U.S. PATENT DOCUMENTS

| | | | |
|---|---|---|---|
| 8,083,878 B1 | 12/2011 | Booth et al. | |
| 2012/0067508 A1 | 3/2012 | Booth | |
| 2017/0050417 A1 | 2/2017 | St. Rock et al. | |
| 2017/0057207 A1 | 3/2017 | Crapo | |

FOREIGN PATENT DOCUMENTS

| | | |
|---|---|---|
| EP | 1871579 | 1/2008 |
| JP | S4910515 | 1/1974 |

OTHER PUBLICATIONS

Translation of CN205853477U (including bib, claims and description). (Year: 2017).*
European Patent Office, European Search Report dated May 29, 2020 in Application No. 19213147.2.

* cited by examiner

*Primary Examiner* — Catherine A. Simone
(74) *Attorney, Agent, or Firm* — Snell & Wilmer L.L.P.

(57) ABSTRACT

A veneer panel may include a face veneer, a first inner layer bonded to the face veneer, a second inner layer bonded to the first inner layer, and a thermally conductive backing layer bonded to the second inner layer. The first inner layer and the second inner layer are treated with a flame retardant. The first inner layer is disposed between the face veneer and the second inner layer, and the second inner layer is disposed between the first inner layer and the thermally conductive backing layer.

13 Claims, 4 Drawing Sheets

THERMALLY LAYERED FIRE TREATED VENEER PANEL

FIELD

The present disclosure relates to decorative and structural panels, and, more specifically, to fire-resistant panels.

BACKGROUND

Various veneer panels are used in aircraft. Certain veneer panels may be susceptible to tearing, wrinkling, and curling. Further, veneer panels may experience delamination in some applications. In other instances, the veneer panels may not be useable in vehicular applications due to other limitations such as conformance with flammability regulations.

SUMMARY

A veneer panel is disclosed, comprising a face veneer, a first inner layer bonded to the face veneer, a second inner layer bonded to the first inner layer, the first inner layer and the second inner layer are treated with a flame retardant, and a thermally conductive backing layer bonded to the second inner layer, wherein the first inner layer is disposed between the face veneer and the second inner layer, and the second inner layer is disposed between the first inner layer and the thermally conductive backing layer.

In various embodiments, the veneer panel further comprises a first adhesive material disposed between the face veneer and the first inner layer, wherein the first adhesive material bonds the first inner layer to a back surface of the face veneer.

In various embodiments, the veneer panel further comprises a second adhesive material disposed between the thermally conductive backing layer and the second inner layer, wherein the second adhesive material bonds the second inner layer to the thermally conductive backing layer.

In various embodiments, the first adhesive material comprises a phenolic adhesive and the second adhesive material comprises an acrylic adhesive.

In various embodiments, the thermally conductive backing layer comprises an annealed aluminum.

In various embodiments, a thickness of the first adhesive material is 0.002 inches and 0.007 inches (i.e., between 0.0508 mm and 0.1778 mm).

In various embodiments, a thickness of the second adhesive material is between 0.001 inches and 0.01 inches (i.e., between 0.0254 mm and 0.254 mm).

In various embodiments, the veneer panel further comprises a third adhesive material disposed between the first inner layer and the second inner layer, wherein the third adhesive material bonds the first inner layer to the second inner layer.

In various embodiments, a thickness of the thermally conductive backing layer is between 0.001 inches and 0.020 inches (i.e., between 0.0254 mm and 0.508 mm).

In various embodiments, a thickness of the face veneer is between 0.016 inches and 0.024 inches (i.e., from 0.4064 mm to 0.6096 mm).

In various embodiments, a thickness of the first inner layer is between 0.016 inches and 0.024 inches (i.e., between 0.4064 mm and 0.6096 mm).

In various embodiments, a thickness of the second inner layer is between 0.016 inches and 0.024 inches (i.e., between 0.4064 mm and 0.6096 mm).

A veneer panel is disclosed, comprising a face veneer, a two-ply panel bonded to the face veneer, the two-ply panel treated with a flame retardant, and a thermally conductive backing layer bonded to the two-ply panel, the thermally conductive backing layer disposed opposite the two-ply panel from the face veneer.

In various embodiments, the veneer panel further comprises a first adhesive material disposed between the face veneer and the two-ply panel, wherein the first adhesive material bonds the two-ply panel to a back surface of the face veneer.

In various embodiments, the veneer panel further comprises a second adhesive material disposed between the thermally conductive backing layer and the two-ply panel, wherein the second adhesive material bonds the two-ply panel to the thermally conductive backing layer.

In various embodiments, the first adhesive material comprises a phenolic adhesive and the second adhesive material comprises an acrylic adhesive.

In various embodiments, the thermally conductive backing layer comprises an aluminum.

In various embodiments, a thickness of the first adhesive material is 0.002 inches and 0.007 inches (i.e., between 0.0508 mm and 0.1778 mm) and a thickness of the second adhesive material is between 0.001 inches and 0.01 inches (i.e., between 0.0254 mm and 0.254 mm).

A method of manufacturing a veneer panel is disclosed, comprising stacking a first inner layer and a second inner layer, disposing a third adhesive material between the first inner layer and the second inner layer, applying heat and pressure to the first inner layer, the third adhesive material, and the second inner layer to create a two-ply panel comprising the first inner layer, the third adhesive material, and the second inner layer, treating the two-ply panel with a flame retardant, stacking a face veneer, the two-ply panel, and a thermally conductive backing layer, disposing a first adhesive material between the two-ply panel and the face veneer, disposing a second adhesive material between the thermally conductive backing layer and the two-ply panel, and applying heat and pressure to at least the face veneer, the thermally conductive backing layer, the first adhesive material, and the second adhesive material.

In various embodiments, the thermally conductive backing layer comprises an aluminum, a thickness of the thermally conductive backing layer is between 0.001 inches and 0.020 inches (i.e., between 0.0254 mm and 0.508 mm).

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

It should be appreciated that considerable benefits will be realized for the safety of passengers and crew in aircraft flying throughout the world to provide a flame resistant wood veneer panel for the construction of aviation interior structures which meets the stringent vertical flammability requirements of Federal Aviation Requirement (FAR) 25.853, which is part of the Title 14 of the Code of Federal Regulations (CFR), issued by the Federal Aviation Administration (FAA), such as the present four-ply flame retardant veneer panel system discussed in greater detail hereinafter.

Four-ply wood veneer panels, according to the present disclosure, may be mounted to furniture (e.g., cabinetry, tables, chairs, etc.) or other elements within an aircraft interior. Four-ply wood veneer panels, according to the present disclosure, may comprise two chemically treated wooden inner layers disposed between a thermally conductive backing layer and a face veneer layer. Adhesive material may bond the four layers together. The resulting four-ply panel may provide increased heat and flame resistance.

Four-ply wood veneer panels, according to the present disclosure, may be configured to address fire retardancy on two fronts: first, by releasing noncombustible gasses from a fire retardant chemical impregnated in a two-ply inner panel that extinguishes the flames, and second, by drawing heat away from the flame, via a thermally conductive backing layer, to extinguish the flame.

Figure 1:
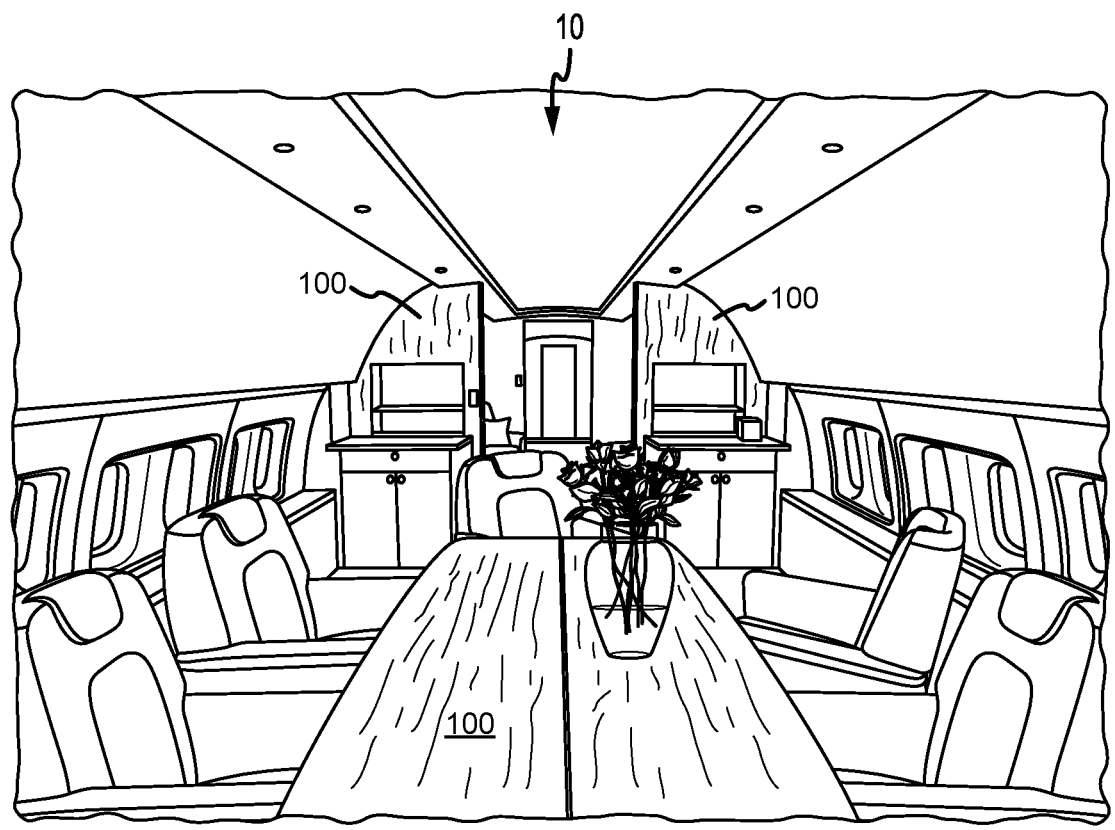
FIG. 1 illustrates an aircraft interior including various elements comprising four-ply veneer panels, in accordance with various embodiments.

Referring now to FIG. 1, an aircraft interior 10 including various elements comprising aviation veneer panels 100 is shown, in accordance with various embodiments. Aviation veneer panels 100 may include four-ply veneer panels, as described below, mounted or otherwise coupled to a substrate (e.g., cabinetry, tables, chairs, hand rails, etc.).

Referring now to FIGS. 2A-2D, formation of a four-ply flame retardant veneer panel system 101 comprising two fire-treated inner layers and a thermally conductive backing layer is illustrated, according to various embodiments. Four-ply flame retardant veneer panel system 101 may be formed by first forming a flame retardant two-ply panel 102 comprising a first fire-treated inner layer 130 (also referred to herein as a first inner layer) and a second fire-treated inner layer 140 (also referred to herein as a second inner layer). First inner layer 130 includes a first surface 131 and a second surface 132 opposite first surface 131. First inner layer 130 may comprise a thin layer of poplar wood, or other wood species. In various embodiments, a thickness T2 of first inner layer 130 extending from first surface 131 to second surface 132 may be between 0.016 inches and 0.024 inches (i.e., between 0.4064 mm and 0.6096 mm). In various embodiments, T2 may be between 0.017 inches and 0.023 inches (i.e., between 0.4318 mm and 0.5842 mm). In various embodiments, T2 may be between 0.018 inches and 0.022 inches (i.e., between 0.4572 mm and 0.5588 mm).

Second inner layer 140 may be similar to first inner layer 130. In this regard, second inner layer 140 includes a first surface 141 and a second surface 142 opposite first surface 141. First inner layer 130 may comprise a thin layer of poplar wood, or other wood species. In various embodiments, a thickness T3 of second inner layer 140 extending from first surface 141 to second surface 142 may be between 0.016 inches and 0.024 inches (i.e., between 0.4064 mm and 0.6096 mm). In various embodiments, T3 may be between 0.017 inches and 0.023 inches (i.e., between 0.4318 mm and 0.5842 mm). In various embodiments, T3 may be between 0.018 inches and 0.022 inches (i.e., between 0.4572 mm and 0.5588 mm).

In various embodiments, a wood grain of first inner layer 130 is oriented in a first direction, such as the X-direction for example, and a wood grain of second inner layer 140 is oriented in a second direction, such as the Y direction for example. In this manner, the wood grains of first inner layer 130 and second inner layer 140 are oriented perpendicular to one another to create a tension-balanced two-ply panel 102 once the first inner layer 130 and second inner layer 140 are cured together via an adhesive material 135 (also referred to herein as a third adhesive).

In various embodiments, adhesive material 135 may be applied over second surface 132 of first inner layer 130, i.e., between first inner layer 130 and second inner layer 140. In various embodiments, adhesive material 135 may be applied over first surface 141 of second inner layer 140, i.e., between first inner layer 130 and second inner layer 140. In various embodiments, adhesive material 135 comprises a phenolic resin. In various embodiments, adhesive material 135 comprises a vinyl-phenolic resin. In various embodiments, adhesive material 135 may be in the form of a thermoset adhesive, such as a dry film phenolic adhesive. A dry film phenolic adhesive may allow adhesive material 135 to be cut in a sheet form and disposed between second surface 132 of first inner layer 130 and first surface 141 of second inner layer 140 during the layup process. In various embodiments, a thickness T4 of adhesive material 135 extending from a first surface 136 of adhesive material 135 to a second surface 137 of adhesive material 135 may be between 0.002 inches and 0.007 inches (i.e., between 0.0508 mm and 0.1778 mm).

Figure 2A:
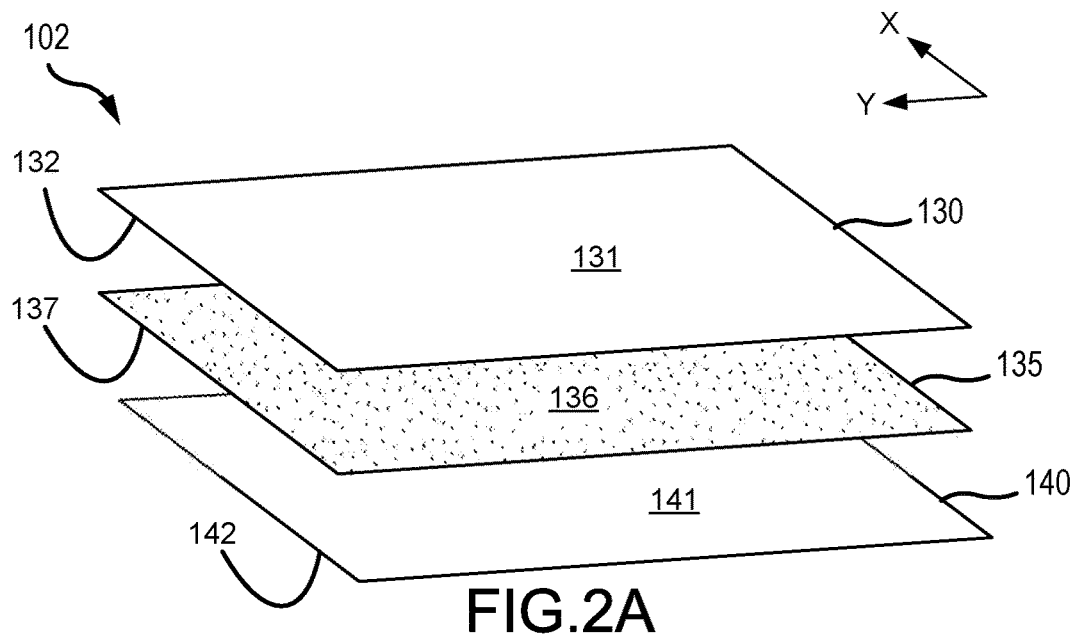
FIGS. 2A and 2B illustrate an assembly view and a cross sectional view, respectively, of a two-ply inner panel for incorporation into four-ply veneer panels, in accordance with various embodiments.
Figure 2B:
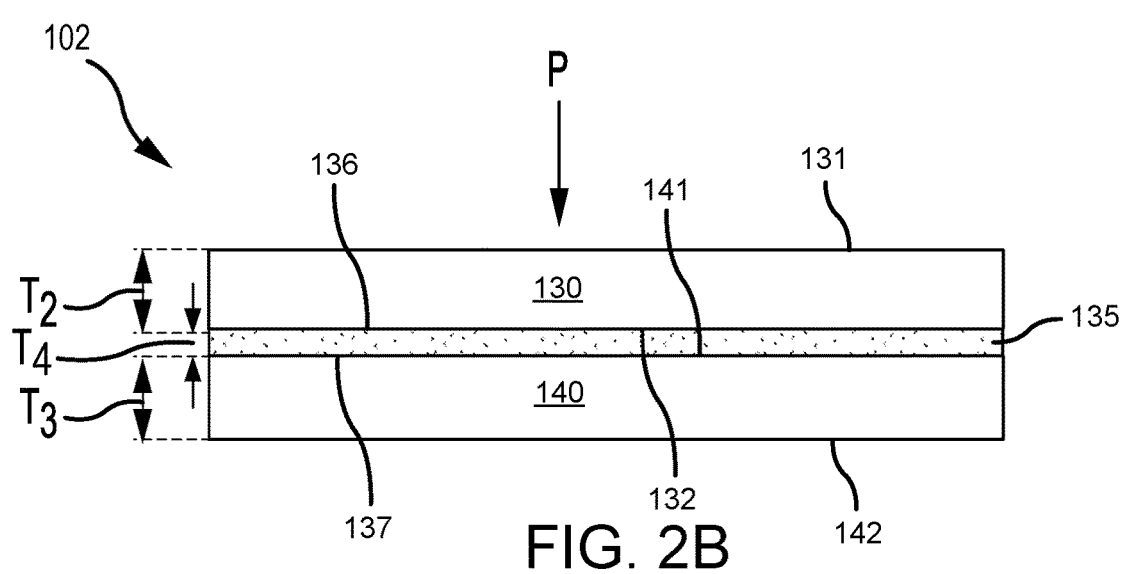

With reference to FIG. 2B, a heat and/or pressure treatment of two-ply panel 102 (e.g., pressing two-ply panel 102 inside a press machine) is illustrated, in accordance with various embodiments. Pressure P may be a compressive force applied uniformly and/or substantially uniformly across the outer surfaces of two-ply panel 102 through first inner layer 130 and second inner layer 140. Two-ply panel 102 may also be heated to reach a thermal threshold necessary to cure the adhesive material 135 to bond first inner layer 130 to second inner layer 140. For example, the adhesive material 135 may wet second surface 132 of first inner layer 130 and first surface 141 of second inner layer 140.

Figure 2C:
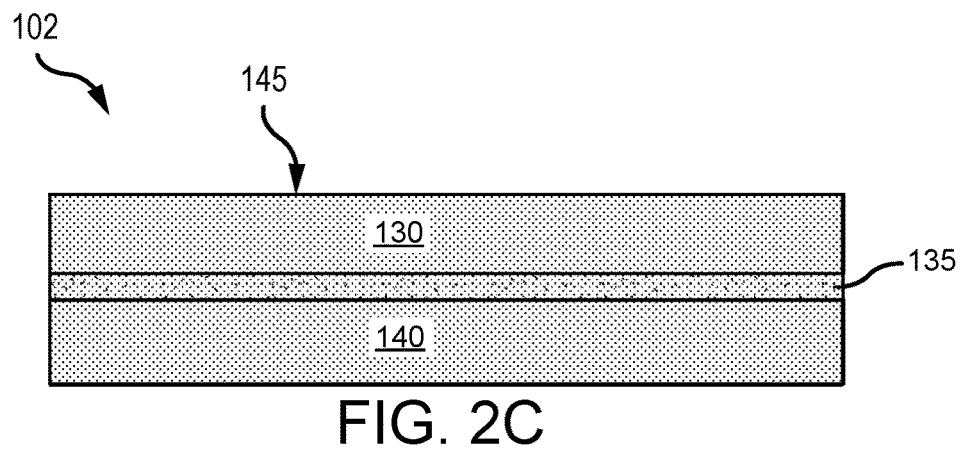
FIG. 2C illustrates a cross section view of the two-ply inner panel of FIG. 2B after being chemically treated with a flame retardant, in accordance with various embodiments.

With reference to FIG. 2C, two-ply panel 102 may be treated with a flame retardant 145 for fire protection. Flame retardant 145 may comprise a bromide solution. In this regard flame retardant 145 may be a brominated flame retardant. Other flame retardants contemplated herein include halogenic chemicals, phosphates, acids, chitosan, boric acid, ammonium borates, ammonium polyphosphate, melamine, borates, silicates, organic silicone, zinc borates, metal hydroxides, sulfonates, graphite or graphene, intumescence, sodium hex metaphosphate, polyethylenimine, among others.

In various embodiments, two-ply panel 102 is soaked with the flame retardant 145. In various embodiments, the flame retardant 145 is brushed or rolled onto two-ply panel 102. In various embodiments, two-ply panel 102 is placed into a bath of the flame retardant 145 for a pre-determined duration. The flame retardant 145 may be absorbed into the two-ply panel 102. The flame retardant 145 is carried by the two-ply panel 102. In response to being burned, for example during a fire, the flame retardant 145—which is infused in two-ply panel 102—emits a gas to suffocate the flames and extinguish the fire. In this regard, flame retardant 145 may act as a gas phase flame retardant by forming a blanket of noncombustible gasses around the flame front. In various embodiments, two-ply panel 102 is sanded down to a desired thickness after being treated with the flame retardant 145.

Figure 2D:
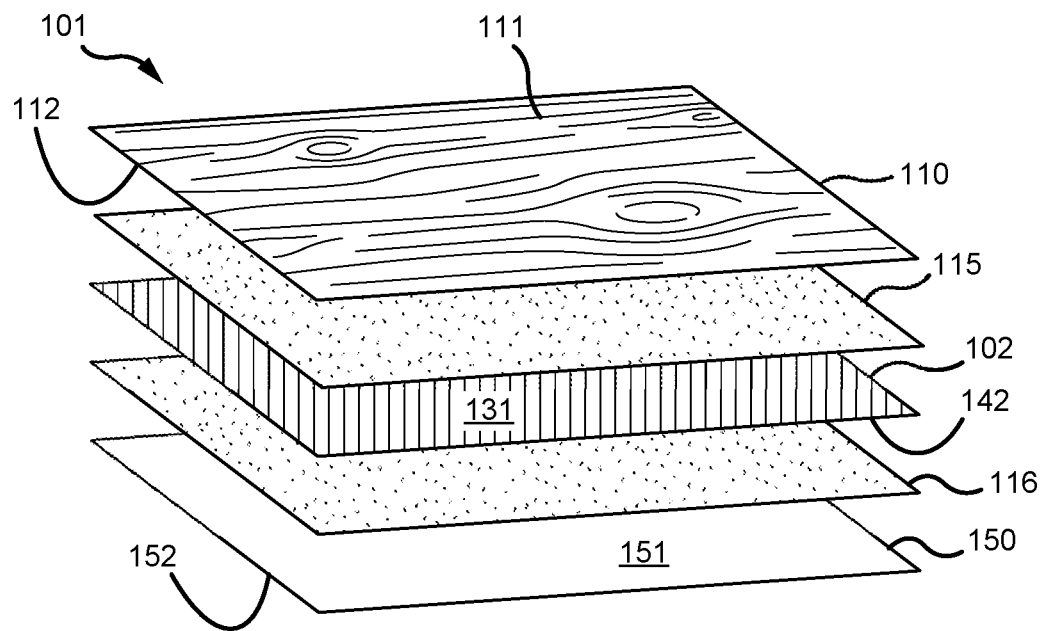
FIGS. 2D and 2E illustrate an assembly view and a cross sectional view, respectively, of a four-ply veneer panel including a face veneer layer, a chemically treated two-ply inner panel, and a thermally conductive backing layer, in accordance with various embodiments.
Figure 2E:
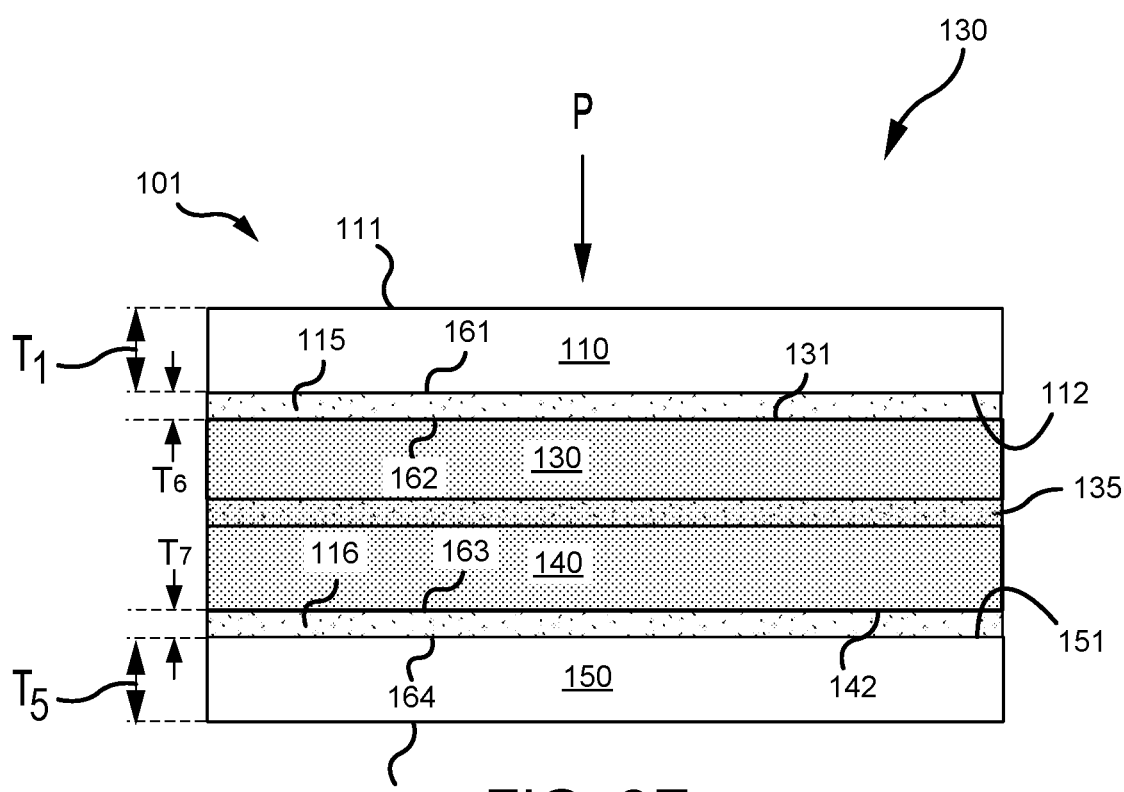

With combined reference to FIG. 2D and FIG. 2E, four-ply flame retardant veneer panel system 101 is further formed by adding a face veneer layer 110 and a thermally conductive backing layer 150 to opposite faces of flame retardant two-ply panel 102.

Face veneer layer 110 may comprise a thin layer of wood, such as walnut, cherry, birch, rosewood, oak, maple, mahogany, hemlock, teak, walnut, or other wood species. Face veneer layer 110 may be manufactured from most wood species, common and exotic alike. Face veneer layer 110 may also be a manufactured product comprising one or more natural wood(s) and/or synthetic materials, referred to herein as "composite wood." Face veneer layer 110 may include a first surface 111 (also referred to as a face surface) and a second surface 112 (also referred to as a back surface) opposite first surface 111. Back surface 112 of face veneer layer 110 may be oriented toward thermally conductive backing layer 150. In various embodiments, first surface 111 of face veneer layer 110 may be sanded to provide a smooth, decorative surface for finishing. In various embodiments, a thickness T1 of face veneer layer 110 extending from first surface 111 to second surface 112 may be between 0.016 inches and 0.024 inches (i.e., from 0.4064 mm to 0.6096 mm). In various embodiments, face veneer layer 110 is not treated with a flame retardant. However, face veneer layer 110 may be treated with a flame retardant, in accordance with various embodiments.

In various embodiments, an adhesive material 115 (also referred to herein as a first adhesive material) may be applied over first surface 131 of two-ply panel 102, i.e., between face veneer layer 110 and first inner layer 130. In various embodiments, adhesive material 115 may be applied over second surface 112 of face veneer layer 110, i.e., between face veneer layer 110 and first inner layer 130. In various embodiments, adhesive material 115 comprises a phenolic resin. In various embodiments, adhesive material 115 comprises a vinyl-phenolic resin. In various embodiments, adhesive material 115 may be in the form of a thermoset adhesive, such as a dry film phenolic adhesive. A dry film phenolic adhesive may allow adhesive material 115 to be cut in a sheet form and disposed between second surface 112 of face veneer layer 110 and first surface 131 of first inner layer 130 during the layup process. In various embodiments, a thickness T6 of adhesive material 115 extending from a first surface 161 of adhesive material 115 to a second surface 162 of adhesive material 115 may be between 0.002 inches and 0.007 inches (i.e., between 0.0508 mm and 0.1778 mm).

Thermally conductive backing layer 150 may comprise a material having a thermally conductivity of 40 W/m·K or greater. In various embodiments, thermally conductive backing layer 150 comprises a metal. Thermally conductive backing layer 150 may comprise one or more layers of aluminum or an aluminum alloy. In various embodiments, thermally conductive backing layer 150 comprises a thin sheet of annealed aluminum. In various embodiments, thermally conductive backing layer 150 may comprise an aluminum foil layer. Thermally conductive backing layer 150 includes a first surface 151 and a second surface 152 opposite first surface 151. In various embodiments, a thickness T5 of thermally conductive backing layer 150 extending from first surface 151 to second surface 152 may be between 0.001 inches and 0.020 inches (i.e., between 0.0254 mm and 0.508 mm). In various embodiments, T5 may be between 0.005 inches and 0.020 inches (i.e., between 0.127 mm and 0.508 mm).

In various embodiments, an adhesive material 116 (also referred to herein as a second adhesive) may be applied over second surface 142 of two-ply panel 102, i.e., between thermally conductive backing layer 150 and second inner layer 140. In various embodiments, adhesive material 116 may be applied over first surface 151 of thermally conductive backing layer 150, i.e., between thermally conductive backing layer 150 and second inner layer 140. In various embodiments, adhesive material 116 comprises a flame-retardant acrylic adhesive. In various embodiments, adhesive material 116 may be in the form of a thermoset adhesive, such as a dry film acrylic adhesive. A dry film acrylic adhesive may allow adhesive material 116 to be cut in a sheet form and disposed between first surface 151 of thermally conductive backing layer 150 and second surface 142 of second inner layer 140 during the layup process. In various embodiments, a thickness T7 of adhesive material 116 extending from a first surface 163 of adhesive material 116 to a second surface 164 of adhesive material 116 may be between 0.001 inches and 0.01 inches (i.e., between 0.0254 mm and 0.254 mm).

With momentary reference to FIG. 2E, a heat and/or pressure treatment of veneer panel system 101 (e.g., pressing veneer panel system 101 inside a press machine) is illustrated, in accordance with various embodiments. Pressure P may be a compressive force applied uniformly and/or substantially uniformly across the outer surfaces of veneer panel system 101 through face veneer layer 110, first inner layer 130, second inner layer 140, and thermally conductive backing layer 150. Veneer panel system 101 may also be heated to reach a thermal threshold necessary to cure the adhesive material 115 to bond first inner layer 130 of two-ply panel 102 to face veneer layer 110 and bond second inner layer 140 of two-ply panel 102 to thermally conductive backing layer 150. For example, the adhesive material 115 may wet second surface 112 of face veneer layer 110 and first surface 131 of first inner layer 130. Likewise, adhesive material 116 may wet first surface 151 of thermally conductive backing layer 150 and second surface 142 of second inner layer 140. Second surface 152 of thermally conductive backing layer 150 may be exposed.

Veneer panel system 101 may be formed in any dimensions, and may readily be made into rectangular 4 foot by 8 foot (i.e., 1.2 m by 2.4 m) panels. Veneer panel system 101 may also be cut into smaller sizes or varied shapes, depending on the substrate (e.g., cabinet, table, rail, etc.) to which veneer panel system 101 may be mounted.

Veneer panel system 101 may be configured to address fire retardancy on two fronts: first, by releasing noncombustible gasses from the flame retardant solution (i.e., flame retardant 145) of two-ply panel 102 that extinguishes the flames, and second, by drawing heat away from the flame, via thermally conductive backing layer 150, to extinguish the flame. Veneer panel system 101 may comply with FAR 25.853.

Figure 3:
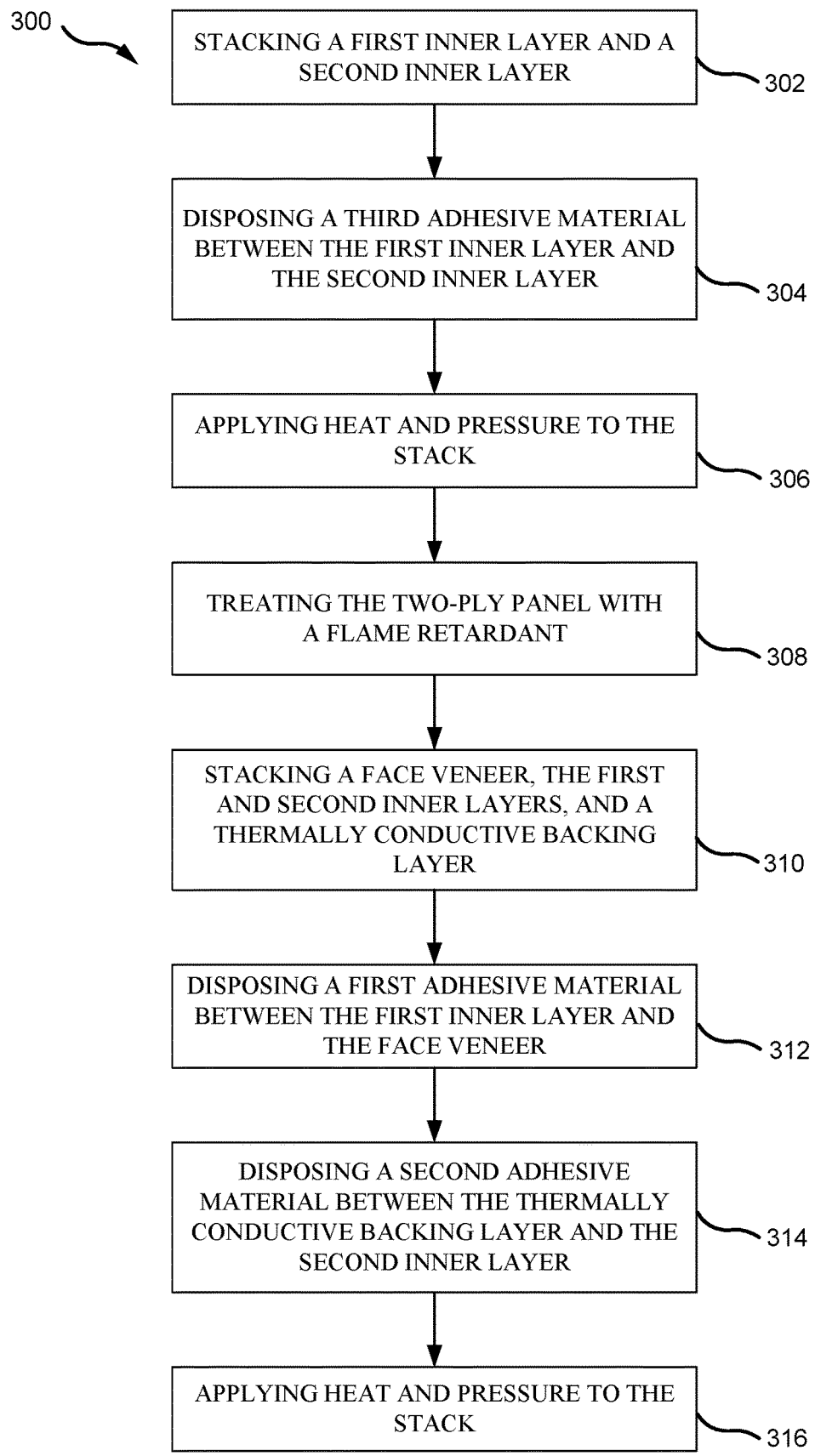
FIG. 3 illustrates a flow diagram of a method of making a four-ply veneer panel, according to various embodiments.

With reference to FIG. 3, a method 300 of making a veneer panel may comprise stacking a first inner layer and a second inner layer (step 302). Method 300 may comprise disposing a third adhesive material between the first inner layer and the second inner layer (step 304). Method 300 may comprise applying heat and pressure to the first inner layer, the third adhesive material, and the second inner layer to create a two-ply panel comprising the first inner layer, the third adhesive material, and the second inner layer (step 306). Method 300 may comprise treating the two-ply panel with a flame retardant (step 308). Method 300 may comprise stacking a face veneer, the two-ply panel, and a thermally conductive backing layer (step 310). Method 300 may comprise disposing a first adhesive material between the two-ply panel and the face veneer (step 312). Method 300 may comprise disposing a second adhesive material between the thermally conductive backing layer and the two-ply panel (step 314). Method 300 may comprise applying heat and pressure to at least the face veneer, the thermally conductive backing layer, the first adhesive material, and the second adhesive material (step 316).

In various embodiments, with combined reference to FIG. 2A through FIG. 3, and with particular focus on FIG. 2A, step 302 may comprise stacking first inner layer 130 and second inner layer 140. Step 304 may comprise disposing adhesive material 135 between first inner layer 130 and second inner layer 140. With particular focus on FIG. 2B, step 306 may comprise applying heat and pressure to first inner layer 130, adhesive material 135, and second inner layer 140 to create two-ply panel 102 comprising first inner layer 130, adhesive material 135, and second inner layer 140. With particular focus on FIG. 2C, step 308 may comprise treating two-ply panel 102 with flame retardant 145. With particular focus on FIG. 2D, step 310 may comprise stacking face veneer layer 110, the two-ply panel 102, and thermally conductive backing layer 150. Step 312 may comprise disposing adhesive material 115 between the two-ply panel 102 and the face veneer layer 110. Step 314 may comprise disposing adhesive material 116 between the thermally conductive backing layer 150 and the two-ply panel 102. With particular focus on FIG. 2E, step 316 may comprise applying heat and pressure to the stack comprising the face veneer layer 110, the two-ply panel 102, the thermally conductive backing layer 150, the first adhesive material 115, the second adhesive material 116, and the third adhesive material 135. In various embodiments, heat is applied by placing the stack into a hot platen press machine for a predetermined duration. In various embodiments, step 316 is performed subsequent to step 306.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A veneer panel, comprising:
   a face veneer;

a first inner layer;
a first adhesive material disposed between the face veneer and the first inner layer, wherein the first adhesive material bonds the first inner layer to a back surface of the face veneer;
a second inner layer bonded to the first inner layer, the first inner layer and the second inner layer are treated with a flame retardant; and
a thermally conductive backing layer; and
a second adhesive material disposed between the thermally conductive backing layer and the second inner layer, wherein the second adhesive material bonds the second inner layer to the thermally conductive backing layer,
wherein the first inner layer is disposed between the face veneer and the second inner layer, and the second inner layer is disposed between the first inner layer and the thermally conductive backing layer, and the first adhesive material comprises a phenolic adhesive and the second adhesive material comprises an acrylic adhesive,
wherein the first inner layer comprises a wood.

2. The veneer panel of claim 1, wherein the thermally conductive backing layer comprises an annealed aluminum.

3. The veneer panel of claim 2, wherein a thickness of the first adhesive material is 0.002 inches and 0.007 inches.

4. The veneer panel of claim 3, wherein a thickness of the second adhesive material is between 0.001 inches and 0.01 inches.

5. The veneer panel of claim 4, further comprising a third adhesive material disposed between the first inner layer and the second inner layer, wherein the third adhesive material bonds the first inner layer to the second inner layer.

6. The veneer panel of claim 5, wherein a thickness of the thermally conductive backing layer is between 0.001 inches and 0.020 inches.

7. The veneer panel of claim 6, wherein a thickness of the face veneer is between 0.016 inches and 0.024 inches.

8. The veneer panel of claim 7, wherein a thickness of the first inner layer is between 0.016 inches and 0.024 inches.

9. The veneer panel of claim 8, wherein a thickness of the second inner layer is between 0.016 inches and 0.024 inches.

10. The veneer panel of claim 1, wherein the flame retardant comprises a bromide solution.

11. A veneer panel, comprising:
a face veneer;
a two-ply panel bonded to the face veneer, the two-ply panel treated with a flame retardant;
a first adhesive material disposed between the face veneer and the two-ply panel, wherein the first adhesive material bonds the two-ply panel to a back surface of the face veneer;
a thermally conductive backing layer disposed opposite the two-ply panel from the face veneer; and
a second adhesive material disposed between the thermally conductive backing layer and the two-ply panel, wherein the second adhesive material bonds the two-ply panel to the thermally conductive backing layer,
wherein the first adhesive material comprises a phenolic adhesive and the second adhesive material comprises an acrylic adhesive,
wherein the two-ply panel comprises a first layer of wood and a second layer of wood.

12. The veneer panel of claim 11, wherein the thermally conductive backing layer comprises an aluminum.

13. The veneer panel of claim 12, wherein a thickness of the first adhesive material is 0.002 inches and 0.007 inches and a thickness of the second adhesive material is between 0.001 inches and 0.01 inches.

* * * * *